Figure 4:
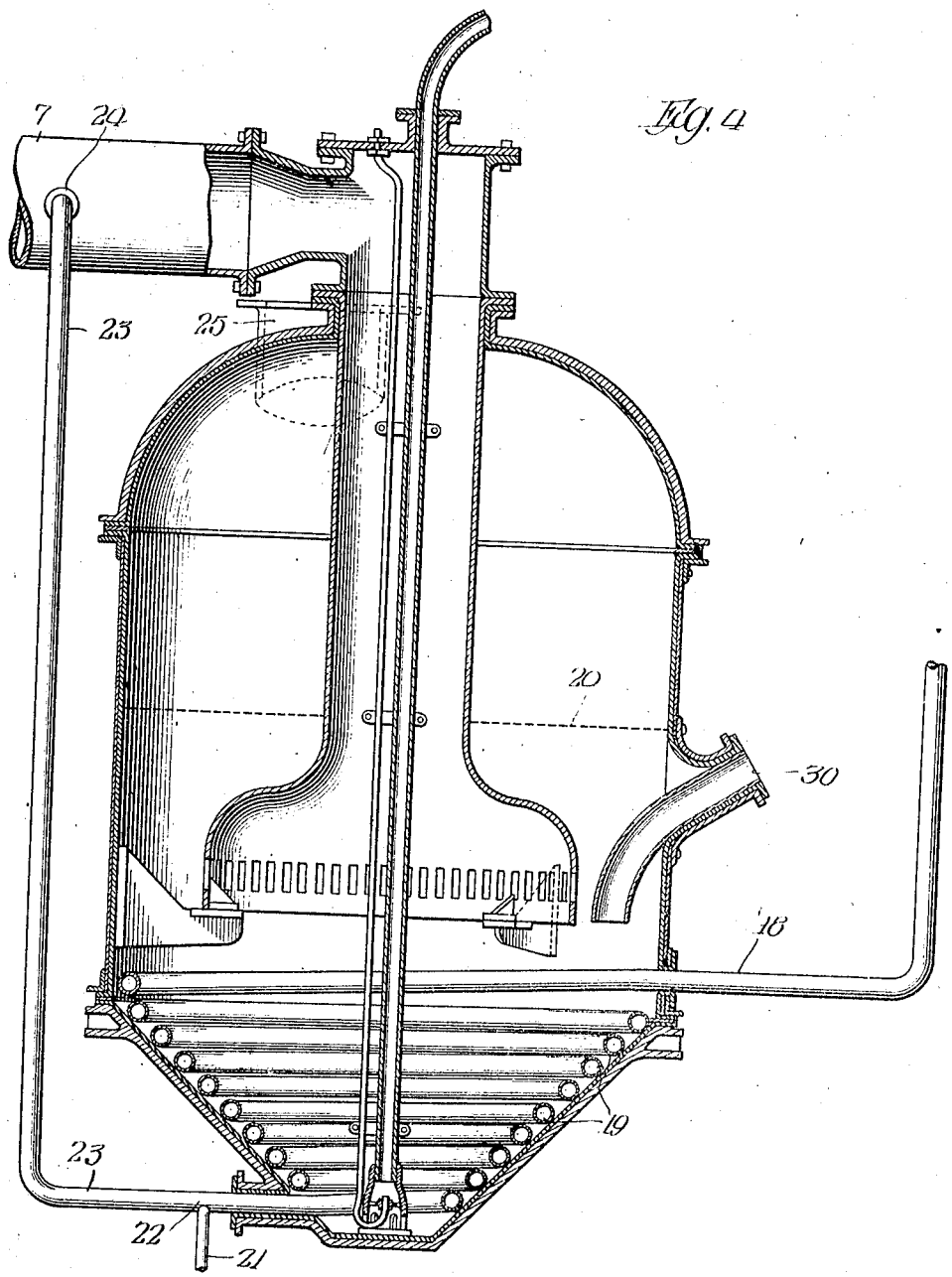

J. BECKER.
APPARATUS AND PROCESS FOR THE RECOVERY OF AMMONIUM SULFATE.
APPLICATION FILED JUNE 23, 1916.
1,291,729.
Patented Jan. 21, 1919.
3 SHEETS—SHEET 1.
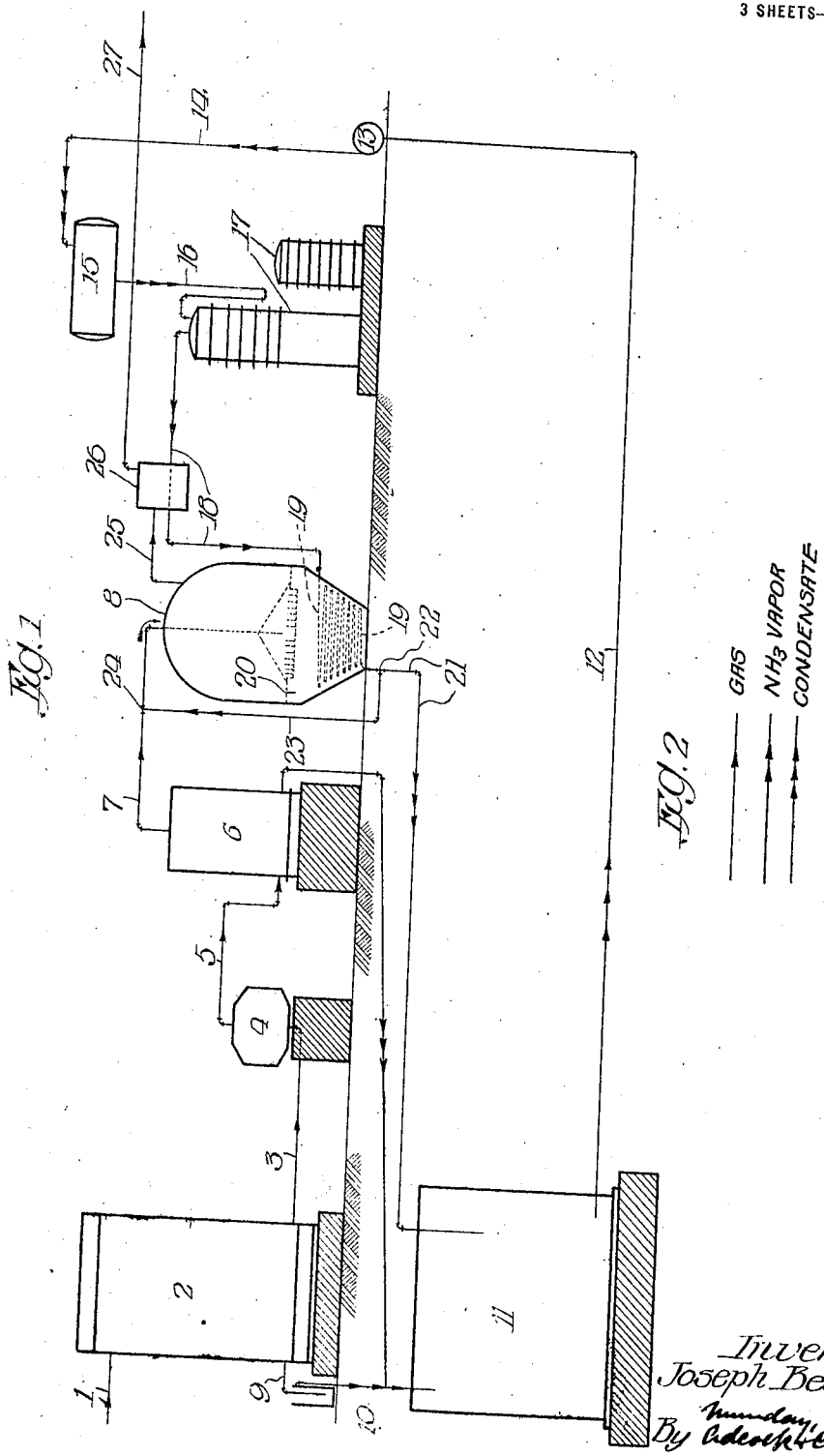

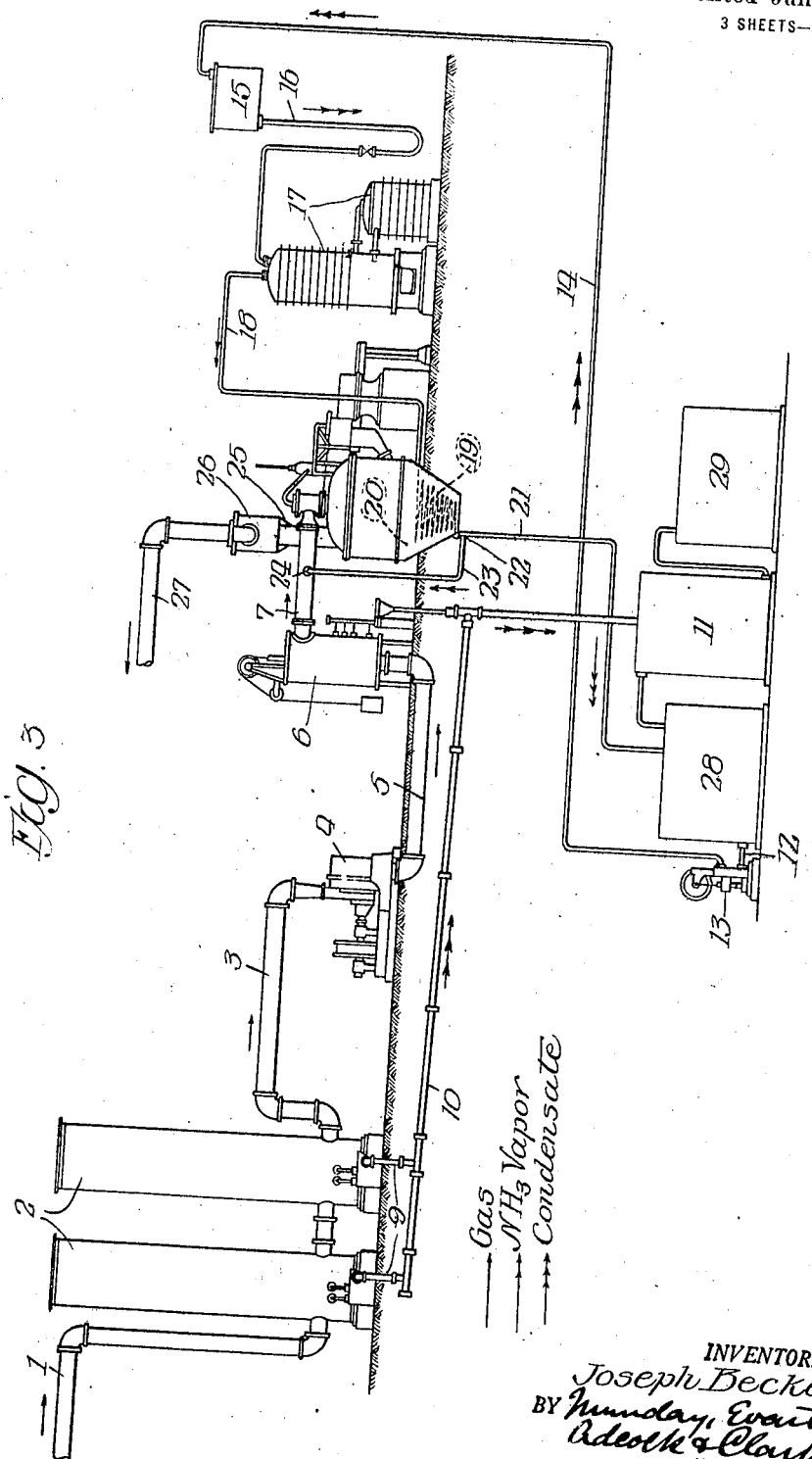

J. BECKER.
APPARATUS AND PROCESS FOR THE RECOVERY OF AMMONIUM SULFATE.
APPLICATION FILED JUNE 23, 1916.

Patented Jan. 21, 1919.

INVENTOR.
Joseph Becker

UNITED STATES PATENT OFFICE.

JOSEPH BECKER, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

APPARATUS AND PROCESS FOR THE RECOVERY OF AMMONIUM SULFATE.

1,291,729.

Specification of Letters Patent.

Patented Jan. 21, 1919.

Application filed June 23, 1916. Serial No. 105,408.

*To all whom it may concern:*

Be it known that I, JOSEPH BECKER, (assignor to H. Koppers Company, a corporation of Pennsylvania,) a subject of Germany, who has declared his intention of becoming a citizen of the United States, and is a resident of Pittsburgh, in the county of Allegheny and State of Pennsylvania, have invented a new and useful Improvement in Apparatus and Processes for the Recovery of Ammonium Sulfate, of which the following is a specification.

This invention relates to the recovery of ammonia in the form of ammonium sulfate, and more particularly concerns apparatus and processes for effecting such recovery and processes from ammoniacal gases from by-product ovens or gas works. And the invention includes among its objects an increasing of the efficiency of such apparatus and processes, and a conserving of the heat required to be employed therein, and such other improvements or advantages in construction and operation as are found to obtain in the devices and methods hereinafter described or claimed.

In the accompanying drawings, forming a part of this specification, and showing, for purposes of illustration, a preferred form and manner in which the invention may be embodied and practised, without limiting the claimed invention specifically to such illustrative instance:—Figure 1 is a merely diagrammatic illustration of the general arrangement and functioning of the principal devices and features in an apparatus embodying and employing the invention, for the recovery of ammonium sulfate from ammoniacal gases from coke or gas ovens; Fig. 2 merely indicates the symbols employed on the conduit lines in Fig. 1; Fig. 3 is a more complete and detailed elevation of such a system of apparatus; Fig. 4 is a vertical sectional detail of the saturator hereinafter more particularly described. Like reference numerals indicate like parts in all of the figures.

The ammoniacal gas from the ovens is led through the conduit 1 into the cooler 2, through which it passes into the conduit 3 leading into the gas exhauster 4, from which it is passed on by the conduit 5 into the tar-extractor 6, and thence on through the conduit 7 into the saturator 8. The condensate from the aforesaid cooler 2 flows therefrom at 9 and through the connection 10 into the condensate tar separating tank 11, into which there may also be led the ammonia liquor separated from the effluent of the aforesaid tar-extractor 6, in a manner already known to the art, as indicated in Fig. 3. From the tank 11 the ammonia liquor passes into the ammonia liquor storage tank 28 and the tar into the tar storage tank 29.

Ammonia liquor from the tank 28 is drawn off through the conduit 12 and forced, by the ammonia liquor pump 13, through the conduit 14, to the ammonia liquor feed tank 15, and thence flows through the conduit 16 to the ammonia still 17.

The distillate steam and ammonia vapors from the ammonia still have been led, in apparatus already known, directly from the still, and sometimes through an intervening condenser, to the gas-inlet into a saturator, commingling with the ammoniacal gas flowing into the saturator from the tar-extractor and gas cooler. And in such arrangement it has been common practice to provide a reheater to reheat the said cooled and tar-freed ammoniacal gas, leaving the tar-extractor, just before such gas is discharged into the saturator, so that such reheated gas may maintain the heat required for the saturation bath within the saturator. But in the apparatus here shown, the distillate steam and ammonia vapors flowing from the ammonia still 17, through the conduit 18, are led directly into and pass through coils 19 immersed in the saturation bath 20 within the aforesaid saturator 8; and by means of such coils the heat derived from the said distillate steam and ammonia vapors, and their condensation, is largely imparted to the saturation bath, the saturator and coils acting as a dephlegmator that maintains the requisite evaporation from the bath, the drying heat so imparted being both that derived from the high temperature of the vapors entering the coils and the latent heat derived from the condensation of the bulk of the steam so passing into said coils. The condensate from said coils is drained off through the conduit 21 into the aforesaid ammonia liquor condensate tank 28, while the ammonia vapors that have passed through said coils are drawn off at 22 and pass through the conduit 23, which at 24 enters the aforesaid gas conduit 7, leading from the tar-extractor 6 into the saturator 8, so that said ammonia vapors are mixed with the said cooled and tar-freed ammoniacal gas flowing into the saturator through said conduit 7.

The saturation bath is a saturated solution of ammonium sulfate and water containing preferably 5 per cent. of free sulfuric acid. The ammoniacal gas and vapor passing through this bath forms ammonium sulfate by the well-known reaction in which this soluble salt is commonly formed. Sulfuric acid in solution (which may be even much under 75% $H_2SO_4$) is simultaneously added to the bath to replace that which is neutralized by the ammonia and maintain the proper excess of acid in the solution in the bath. The temperature of the bath is so raised, by the heat imparted through the said coils 19, as to maintain the required evaporation of the water in the bath, to faciliate the precipitation of the ammonium sulfate. The heat so imparted is, as before said, that given up by the cooling and through the partial condensation of the distillate steam and ammonia vapors, which necessarily, when they leave the ammonia still, are vaporized and at the high temperature required to effect their distillation in the still. The arrangement conserves and utilizes such heat and eliminates the need for supplementary reheater devices and heat supply to heat the saturation bath or to reheat the cooled and tar-freed ammoniacal gas entering the saturator; and other practical advantages in the arrangement will be apparent.

The gases passing through the saturator 8 are drawn off through the conduit 25 to the acid-separator 26 and thence off through the conduit 27. The drain 30 leads into the saturator from the usual draining table.

The invention may be embodied or practised in apparatus and ways differing from the apparatus and process hereinabove particularly described for purposes of illustration, and still be within the scope of the claim hereinafter made.

What is claimed is:—

1. In a process for the recovery of ammonium sulfate, the maintaining of evaporation from the saturator-bath by heating the bath, and the ammoniacal gases discharging through it, with heat imparted thereto from the cooling and condensation in a passing current of vapors from the ammonia still, the condensate from such current being drained off to prevent dilution of the saturator-bath; substantially as specified.

2. In a process for the recovery of ammonium sulfate, the maintaining of evaporation from the saturator-bath by heating the bath, and the ammoniacal gases discharging through it, with heat imparted thereto from the cooling and condensation in a passing current of vapors from the ammonia still, such current being led circuitously through the saturator bath; substantially as specified.

3. In a process for the recovery of ammonium sulfate: maintaining evaporation from the saturator-bath by heating the bath, and the ammoniacal gases discharging through it, with heat imparted thereto from the cooling and condensation in a passing current of vapors from the ammonia still; and draining off the condensate and delivering the rest of such vapors into the bath with said gases; substantially as specified.

4. In apparatus for the recovery of ammonium sulfate, in combination: a saturator, adapted to contain the saturation-bath; inlet pipes for discharging ammoniacal gases into the saturation-bath; an ammonia-liquor still; and vapor conduits leading from the still to and in contiguity with the saturator and adapted to maintain evaporation from the saturation-bath by heat imparted, to said bath and gases, from the cooling and condensation of the still vapors passing through said conduits, said conduits being provided with a drain to carry off the condensate and prevent dilution of the saturation-bath; substantially as specified.

5. In apparatus for the recovery of ammonium sulfate, in combination: a saturator, adapted to contain the saturation-bath; inlet pipes for discharging ammoniacal gases into the saturation-bath; an ammonia-liquor still; and vapor conduits leading from the still to and circuitously through the lower part of the saturator and adapted to maintain evaporation from the saturation-bath by heat imparted, to said bath and gases, from the cooling and condensation of the still vapors passing through said conduits; substantially as specified.

6. In apparatus for the recovery of ammonium sulfate, in combination: a saturator, adapted to contain the saturation-bath; inlet pipes for discharging ammoniacal gases into the saturation-bath; an ammonia-liquor still; vapor conduits leading from the still to and in contiguity with the saturator and adapted to maintain evaporation from the saturator-bath by heat imparted, to said bath and gases, from the cooling condensation of the still vapors passing through said conduits; and extensions from said conduits, for drawing off the condensate and for leading the rest of said vapors to discharge into the saturation-bath; substantially as specified.

7. In apparatus for the recovery of ammonium sulfate, in combination: a saturator, adapted to contain the saturation-bath; inlet pipes for discharging ammoniacal gases into the saturation-bath; an ammonia-liquor still; coils within the saturator and connected to the still, for passing the still-vapors through the saturator, said saturator and coils being adapted to act as a dephlegmator for the saturation-bath, by imparting to it and the aforesaid gases the heat derived from the cooling and condensation of such passing still-vapors; substantially as specified.

In testimony whereof I have hereunto set my hand in the presence of two subscribing witnesses.

JOSEPH BECKER.

Witnesses:
HENRY LOVE CLARKE,
JOSEPH VAN ACKERON